United States Patent [19]

Heckmann

[11] Patent Number: 5,651,822
[45] Date of Patent: Jul. 29, 1997

[54] VEHICLE BODY SURFACE TREATMENT APPARATUS

[75] Inventor: Norbert Heckmann, Morschen/Konnefeld, Germany

[73] Assignee: ABB Flakt AB, Stockholm, Sweden

[21] Appl. No.: 501,067

[22] PCT Filed: Feb. 9, 1994

[86] PCT No.: PCT/EP94/00369

§ 371 Date: Oct. 18, 1995

§ 102(e) Date: Oct. 18, 1995

[87] PCT Pub. No.: WO94/17926

PCT Pub. Date: Aug. 18, 1994

[30] Foreign Application Priority Data

Feb. 11, 1993 [DE] Germany .............. 43 04 145.0

[51] Int. Cl.⁶ .................. B05C 3/02; B05C 3/10
[52] U.S. Cl. .............. 118/426; 118/409; 118/423; 118/428; 118/500; 198/346.3; 198/378; 198/465.4
[58] Field of Search .................. 118/423, 426, 118/428, 409, 500, 501; 198/346.3, 465.4, 378

[56] References Cited

U.S. PATENT DOCUMENTS 4,659,445 4/1987 Bogdan et al. .

FOREIGN PATENT DOCUMENTS

| 0118756 | 9/1984 | European Pat. Off. . |
| 2146851 | 3/1973 | Germany . |
| 3223022 | 10/1991 | Japan . |
| 2229381 | 9/1990 | United Kingdom . |

Primary Examiner—Donald E. Czaja
Assistant Examiner—Steven B. Leavitt
Attorney, Agent, or Firm—Burns, Doane, Swecker & Mathis, L.L.P.

[57] ABSTRACT

In order to create a simple car body surface treatment device, a car body is introduced into and removed again from the treatment bath (11) simply by being rotated by a rotating device (2), at the same time as another car body is pushed onto and secured to said rotating device or conveyed past said device. The car body is fixed to a loading carriage (5) and is pushed by means of some driven rotary rollers (3a) onto the rotating device (2). By means of fastening devices (4a, 4b) the loading carriage (5) is detachably secured to the car body on the rotating device (2). By rotating through 180° around an axis of rotation (7), the rotating device (2) dips together with the car body over its tail or front side into the treatment bath (11). While one car body is submerged, another loading carriage (5) together with the car body fastened thereon may be conveyed by the driven rotary rollers (3b) past the rotating device (2) for subsequent treatment, over the top surface of the rotating device (2).

4 Claims, 2 Drawing Sheets

VEHICLE BODY SURFACE TREATMENT APPARATUS

FIELD OF THE INVENTION

The invention relates to an apparatus for treating the surface of one or more vehicle bodies and more particularly to an apparatus for surface treating one or more vehicles in which a rotating device adapted to have at least one vehicle body secured thereto is designed to dip the vehicle body into a treatment bath through rotation about 180°.

BACKGROUND OF THE INVENTION

A surface treatment apparatus for vehicle bodies which, by rotation about 180°, is dipped into a treatment bath or, by a counter-rotation, is removed again out of this, is known from GB 2 229 381. In this apparatus, a vehicle body is securely mounted by means of a type of loading pallet. This unit consisting of the loading pallet with the vehicle body mounted thereon is placed on a rolling carriage. This rolling carriage is in turn equipped with non-driven rollers which enable displacement transversally to the longitudinal axis of the vehicle body. By means of such a non-driven rolling carriage, the loading pallet is transported together with the vehicle body from the treatment bath to further processing stations.

The entire combination consisting of the vehicle body, the loading pallet and the rolling carriage is pushed onto a mounting which is arranged above each treatment bath. This mounting has a rotational axis arranged transversely to the longitudinal axis of the vehicle body and parallel to the transport direction. By rotation about this rotational axis by 180°, the entire combination consisting of the vehicle body, the loading pallet and the rolling carriage can be dipped into the treatment bath. During this submerging process, the mentioned mounting and the unit consisting of the vehicle body, the loading pallet and the rolling carriage are connected with each other by means of locking bolts.

In order to transport the vehicle bodies or the rolling carriage, respectively, a conveyor belt is provided which extends through several treatment stations having an associated treatment bath. These treatment stations lie side-by-side and the conveyor belt transports the rolling carriage, on which a loading pallet with the vehicle body is respectively mounted, from one treatment basin to another treatment basin. For this purpose, vertically standing pallet parts which lie against the rolling carriage are mounted on the conveyor belt. This type of apparatus for introducing a vehicle body has the advantage that slopping of the treatment liquid in the treatment bath is minimized by means of a simple mechanism in that the vehicle body is rotated into the treatment path via the front or rear side. The volume of air locked in the vehicle body can then continuously escape out of the windows of the vehicle body during the rotating process.

The construction of this apparatus is relatively complicated and only suitable for very small units. When a vehicle body has to be dipped, the next vehicle body must wait until the processing time of the first body has expired. This processing time lasts up to three minutes in the case of pre-treatment in individual processing steps and even longer in cathodic dip-coating.

SUMMARY OF THE INVENTION

Under consideration of the previously mentioned problems, the invention is based on the object of providing a more simple apparatus which dips at least one vehicle body into a treatment bath by means of rotation and makes it possible when the vehicle body is submerged for a further vehicle body to be pushed onto this rotating device and to be releasably connected.

According to this, a loading carriage serves to receive and secure the vehicle body. The loading carriage and the vehicle body are not separated from one another during the entire duration of the treatment in an apparatus as a whole which is formed by the arrangement in series of several such stations having a treatment bath. The loading carriage with the vehicle body is pushed by means of one or more driven rotary rollers onto a rotating device and releasably connected with this by means of fastening devices. The rotating device is mounted above the treatment bath and includes a rotational axis arranged transversely to the transport direction of the vehicle bodies. The introduction of the vehicle body then ensues by means of rotation of the rotating device in such a manner that the vehicle body is dipped via its front or rear end into the treatment bath. Since only the cheap loading carriage is required for each vehicle body, a cost reduction results. Additionally, there is no longer a need for a transfer zone for the loading pallets in the apparatus forming the basis of the invention, since these pallets are omitted completely. In order to further transport the loading carriages with the vehicle bodies, respectively one or more of the rotary rollers on the upper and lower side of the rotating device are driven. Thus, an independent transport of the individual loading carriages is possible.

Additionally, the simple construction of the apparatus makes an increase in the timing rate for introducing the vehicle bodies into the treatment bath possible in that a new vehicle body with a loading carriage can be conveyed past the treatment bath when a vehicle body is being dipped. An alternative embodiment with fastening devices on the upper and lower side would make it possible, when one vehicle body is submerged, to push on and fix another one of these bodies. The dipped vehicle body and the new, still untreated vehicle body can then be switched by rotation.

The capacity of the entire unit is therefore now only limited by the dipping time and no longer by the processing time and consequently permits longer lasting treatments such as cathodic dip-coating.

The use of the known loading carriage technique makes the required combination of spraying land dipping processes possible, both in the case of pre-treatment as well as in the case of dip-coating the vehicle body.

BRIEF DESCRIPTION OF THE DRAWINGS FIGURES

The invention is illustrated in an exemplary manner in the drawings and described in more detail in the following.

FIG. 1 shows a longitudinal section of a treatment bath with an inventive rotating device, and FIG. 2 shows a cross section along the line II—II of FIG. 1.

DETAILED DESCRIPTION OF THE INVENTION

Figure 1:
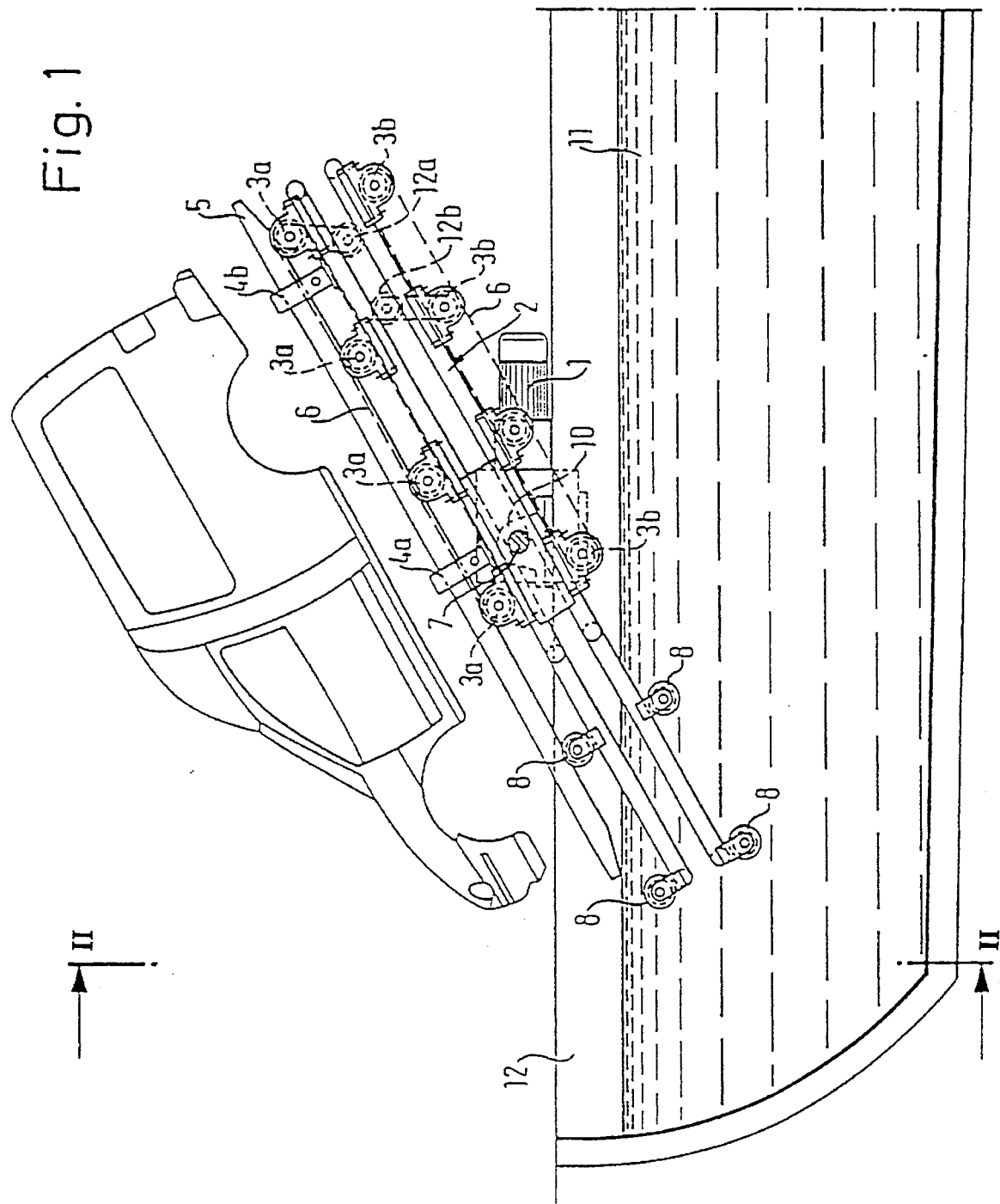
Figure 2:
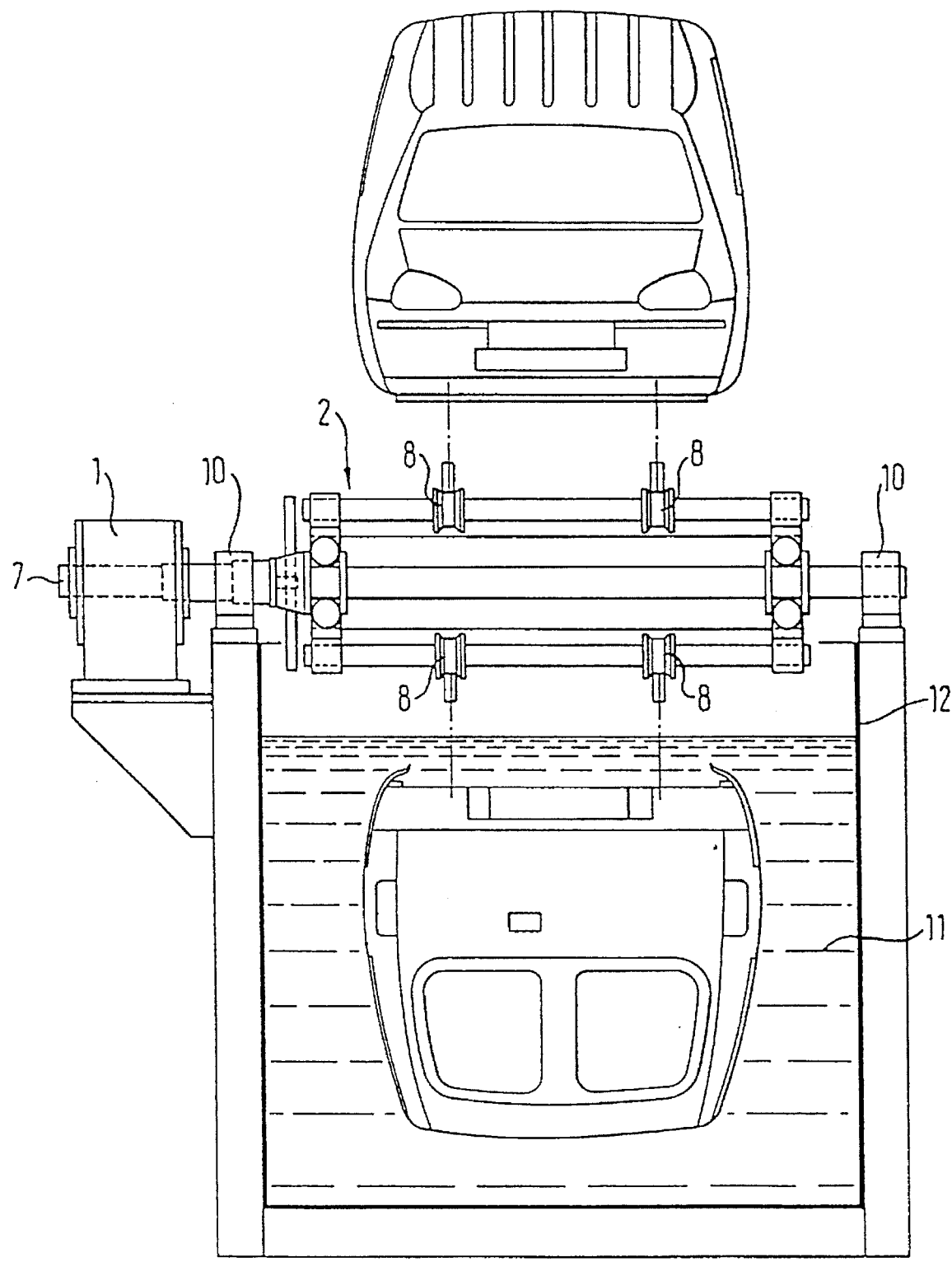

An inventive rotating device 2 is mounted above the treatment bath in the apparatus according to the invention. The rotating device 2 is supported in this at the right and left at the ends of a rotational axis 7 by means of bearing blocks 10 on the container wall 12. A drive 1 is flanged to the one end of the rotational axis 7 and makes it possible to cause the rotational axis 7 to rotate via a transmission. On the upper and lower sides of the rotating device 2 there is respectively mounted a receiving device consisting of a plurality of guide rollers 8, a fastening device 4a, 4b (only the upper side) and several rotary rollers 3a, 3b. The guide rollers 8 and the rotary rollers 3a, 3b are formed like rims so that the longitudinal carriers of the loading carriage 5 can be guided through these. They serve for the lateral support of the loading carriages 5 during transport. The plurality of rotary rollers 3a, 3b and the guide rollers 8 are distributed at equal distances along the upper and lower sides. These rollers 3a, 3b, 8 are rotatably supported so that a loading carriage 5 can be pushed on or transported away from the rotating device 2 in the transport direction. For this purpose, the rotary rollers 3a, 3b are connected by means of a conveyor belt 6, respectively one of the rotary rollers 3a, 3b being driven by means of a roller drive 12a, 12b such as an electric gear motor. The rollers 3a, 3b, 8 of one receiving device together form a support for one loading carriage. For releasable connection of the rotating device 2 and the loading carriage 5, fastening devices 4a, 4b are placed at the sides of the upper side of the rotating device 2.

The mode of operation of this embodiment is explained in the following. Before the beginning of the surface treatment or the treatment of the vehicle body in a combination of several treatment stations, the vehicle body is securely fastened to a loading carriage 5. The loading carriage 5 is then transported via guide rollers 8 and by means of the rotary rollers 3a onto the rotating device 2. The loading pallet 5 is in this case guided by the lateral guidance of the rollers 3a and 8 which are mounted on the rotating device 2. When the loading carriage 5 is in the correct position on the rotating device 2, the roller drive 12a of the rotary rollers 3a is stopped and the loading carriage 5 is securely connected to the rotating device 2 by means of the fastening devices 4a, 4b. This occurs by clamping or bolting the fastening devices 4a, 4b which engage with the loading carriage 5. The entire rotating device 2 is then rotated by 180°. During the rotating process, the rotating device 2 together with the loading carriage 5 and the vehicle body dips via the front or rear side into the treatment bath 11. After completion of the rotating process, the vehicle body is completely submerged in the treatment bath. By means of rotation about 180°, the previous upper and lower sides have been swapped with one another. The present lower side is now subsequently denoted the upper side. The upper side of the rotating device 2 is also provided with one or more receiving devices which make it possible when a vehicle body is submerged to convey a new loading carriage 5 with a further vehicle body over this.

In a further exemplary embodiment (not shown), not only the upper side, but also the lower side is provided with a fastening device 4a, 4b. When the vehicle body is submerged, the fixing of a further loading carriage 5 onto the now upper side is possible. By rotation about a further 180° or by rotating back about 180°, the newly mounted vehicle body is dipped into the treatment bath 11 while the treated vehicle body is simultaneously conveyed out of this.

Also in this embodiment, it is naturally possible to mount several receiving devices on the upper and lower sides.

What is claimed is:

1. An apparatus for surface treatment of one or more vehicle bodies moving in a transport direction, comprising a rotatably driven rotating device for dipping the vehicle body into a treatment bath through rotation about 180° and for conveying the vehicle body out of the treatment bath through further rotation, the rotating device being rotatable about a rotational axis that is disposed transversely to the transport direction of the vehicle body, the rotating device having an upper side and a lower side, at least one receiving device disposed on each of the upper side of the rotating device and the lower side of the rotating device for receiving a loading carriage that is releasably connected to a vehicle body.

2. An apparatus according to claim 1, wherein the receiving device on the upper side of the rotating device and the receiving device on the lower side of the rotating device each includes a plurality of guide rollers and a plurality of rotary rollers to guide and move the loading carriage, and at least one fastening device for fastening the loading carriage onto the rotating device.

3. An apparatus according to claim 2, including a roller drive operatively associated with at least one of the rotary rollers of one of the receiving devices for driving the at least one rotary roller.

4. An apparatus according to claim 3, wherein several of the rotary rollers of each receiving device are connected to one another by a conveyor belt.

* * * * *